April 6, 1965   K. HERRMANN   3,176,482
MAGAZINE CONTAINING SEVERAL PHOTOFLASH LAMPS
Filed Aug. 3, 1961
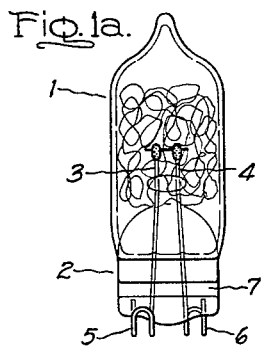
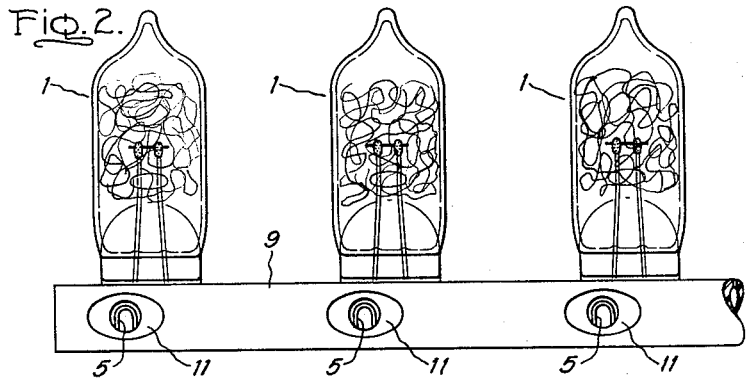
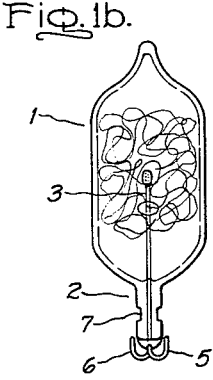
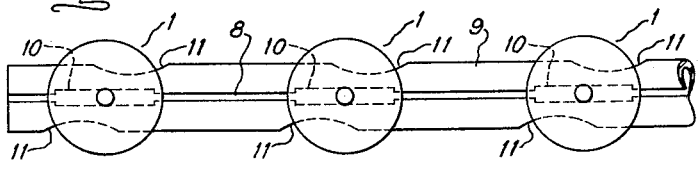
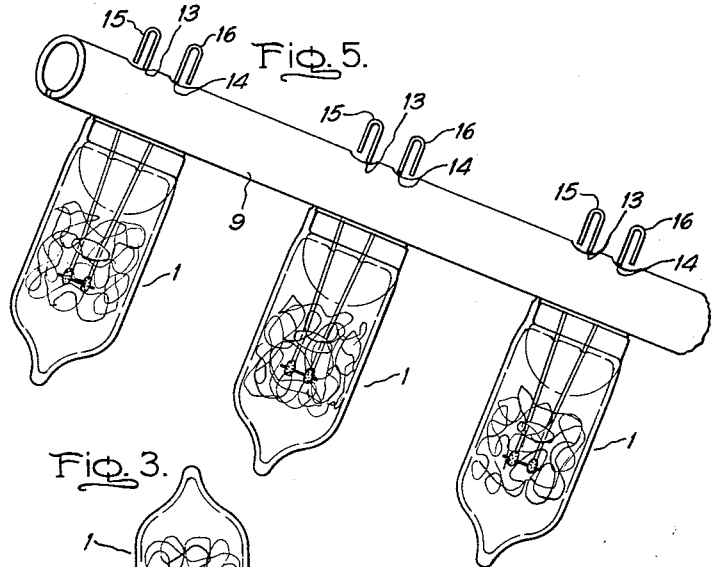
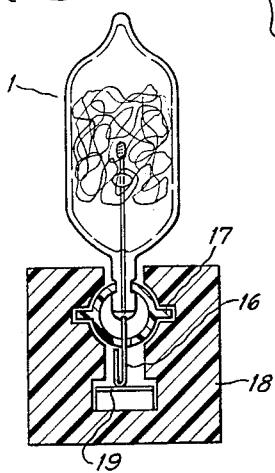
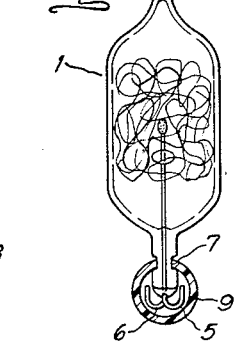
Inventor:
Karl Herrmann
by Henry P. Truesdell
His Attorney

United States Patent Office 3,176,482
Patented Apr. 6, 1965

3,176,482
MAGAZINE CONTAINING SEVERAL
PHOTOFLASH LAMPS
Karl Herrmann, Augsburg, Germany, assignor to Patent-Treuhand-Gesellschaft fur elektrische Gluhlampen m.b.H.
Filed Aug. 3, 1961, Ser. No. 129,149
Claims priority, application Germany, Aug. 26, 1960, P 25,583
1 Claim. (Cl. 67—31)

This invention in general relates to photoflash lamps and more particularly to a magazine containing a plurality of baseless, all-glass midget photographic flash lamps provided with a flat stem press from which lead wires protrude to form terminal contacts, which magazine is adapted to be inserted as a unit into a suitable flash device.

It is an object of this invention to provide an economical unit containing a plurality of flash lamps which may be inserted into a flash device and the lamps flashed in rapid succession but from which the lamps may be removed for individual use if desired.

In accordance with this invention, a body or base portion of the magazine is provided which consists of a resilient tube having a longitudinal slit with notches spaced therealong into which the several photoflash lamps are clamped by their stem presses. The tube has preferably only one longitudinal slit in which the photoflash lamps are put side by side. Means are provided in the tube such that the terminal contacts of each of these flash lamps in the tube may be engaged by contact elements of the magazine flash device. These means may comprise apertures located such that the terminal contacts of the lamp may be contacted therethrough by contacts of the flash device which contacts may be, for instance, flexible tongues which are resiliently urged into the apertures to electrically connect the lamps with the flash device when the particular lamp comes into flashing position. In accordance with another embodiment of the invention, these means may comprise apertures through which the terminal contacts of the lamp protrude to be engaged by the contacts of the flash device.

Further objects and advantages of the invention will appear from the following detailed description thereof and from the accompanying drawing:

FIG. 1a is a front elevational view showing an all-glass midget photoflash lamp for which the magazine according to the invention is particularly suitable;

FIG. 1b is a side elevation of the same type of lamp;

FIG. 2 is a side view of a magazine having lateral contact apertures;

FIG. 3 is an end view of the unit shown in FIG. 2;

FIG. 4 is a top view of the unit shown in FIG. 2;

FIG. 5 is a perspective view of a modification of the magazine wherein the apertures lie opposite to the slit and the lead wires extend therethrough; and FIG. 6 is an end view of still another modification.

As shown in FIGS. 1a and 1b, the type of photoflash lamp 1 particularly suitable to this invention comprises a glass bulb having a flat stem press 2 in which leads 3 and 4 are sealed. Outer ends 5 and 6 of the leads protrude out of the stem press 2 and are usually bound around the latter in the form of a loop to form terminal contacts. The outer end of each lead is retroverted and embedded in the stem press 2. The press form of the stem 2 has at least on one side and preferably on both sides a profiling, e.g., a groove 7 extending transversely therealong.

As shown in FIGS. 2, 3 and 4, the magazine unit comprises a plurality of lamps 1 mounted in a resilient tubular body or base portion 9 formed with a slit 8. The slit 8 is provided with spaced-apart notches 10 which tightly enclose the stem press 2 of lamp 1. The arrangement is such that the edges of notches 10 rest in grooves 7 of the stem press. The notches 10 are spaced such that the lamps 1 will be separated from each other so as to prevent simultaneous flashing. For each lamp 1 on the tubular body portion 9, apertures 11 are provided in opposed sides which leave uncovered loops 5 and 6 of the leads whereby they may be engaged by contacts of the flash device.

In the embodiments of the invention shown in FIGS. 5 and 6, apertures 13 and 14 are arranged in side-by-side relationship in the part of the tube opposite to the slit 8 and the leads 3 and 4 of the photoflash lamps are made in extended loops 15 and 16 which protrude through the apertures 13 and 14.

As shown in FIG. 6, the tube 9 may be provided with longitudinally extending ribs 17 by means of which the magazine unit may be guided in a flash device. Thus, the cartridge unit will be guided by ribs 17 through a rail 18 having slots to mate with the ribs of a flash device and maintain extended loops 15 and 16 in engagement with contacts 19.

The tube 9 is preferably made of a flexible material, for example a synthetic resin, and the notches 10 are of such a depth as to restrain the lamps from inadvertent longitudinal movement while still permitting the tube to resiliently grip the lamps. Since the tube is resilient, the lamps may be removed, if desired, for individual use.

Although several preferred embodiments of this invention have been disclosed, it will be understood that the invention is not to be limited to this specific construction and arrangement of parts shown but that they may be widely modified within the spirit and scope of the invention as defined by the appended claims.

What I claim as new and desire to secure by Letters Patent of the United States is:

A photoflash magazine unit for use in a flash device comprising, in combination, a plurality of photoflash lamps each having a flat stem press provided with at least one transverse groove with lead-in wires protruding from the press and being retroverted to form terminal contacts for the lamp, and a flexible resilient tubular base of synthetic resin having a longitudinal slit therein, said slit being provided with notches spaced along the length of said base to receive said lamps with the edges of said notches resting in said transverse grooves so that said lamps are resiliently mounted within the slit in said base spaced from each other and with the notches gripping said transverse grooves to restrain the lamps from inadvertent longitudinal movement along the length of the base, opposite sides of said base being provided with apertures to expose said terminal contacts of each lamp when mounted in said base for engagement by contacts of a flash device.

References Cited by the Examiner

UNITED STATES PATENTS

| | | | |
|---|---|---|---|
| 2,408,470 | 10/46 | Noel et al. | 67—31 X |
| 2,415,902 | 2/47 | Noel | 67—31 X |
| 2,741,411 | 4/56 | Olden | 67—31 X |
| 2,839,667 | 6/58 | Cannella | 67—31 X |
| 3,003,053 | 10/61 | Brooks et al. | 67—31 X |
| 3,014,122 | 12/61 | Hornack | 67—31 X |
| 3,016,727 | 1/62 | Vanden Boom et al. | 67—31 |
| 3,064,457 | 11/62 | Vanden Boom et al. | 67—31 |

EDWARD J. MICHAEL, *Primary Examiner.*

FREDERICK L. MATTESON, Jr., *Examiner.*